(12) United States Patent
York et al.

(10) Patent No.: US 6,750,587 B2
(45) Date of Patent: Jun. 15, 2004

(54) HIGH RPM/OUTPUT ROTOR

(75) Inventors: Michael Timothy York, Chelsea, MI (US); Anthony Militello, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/109,326

(22) Filed: Mar. 28, 2002

(65) Prior Publication Data
US 2003/0184187 A1 Oct. 2, 2003

(51) Int. Cl.⁷ .................. H02K 3/52; H02K 21/04; H02K 1/22
(52) U.S. Cl. ........................... 310/263; 310/91
(58) Field of Search ................ 310/91, 261, 263

(56) References Cited

U.S. PATENT DOCUMENTS

| | | |
|---|---|---|
| 561,590 A | 6/1896 | Ide |
| 2,196,682 A * | 4/1940 | Nowosielski .......... 310/156.73 |
| 3,445,694 A | 5/1969 | Campbell et al. |
| 3,462,627 A | 8/1969 | Schwab et al. |
| 3,571,637 A | 3/1971 | Henningsen et al. |
| 5,483,116 A | 1/1996 | Kusase et al. |
| 5,519,277 A | 5/1996 | York et al. |
| 5,539,265 A * | 7/1996 | Harris et al. .................. 310/263 |
| RE36,038 E * | 1/1999 | Nakamura et al. .......... 310/263 |
| 5,925,964 A | 7/1999 | Kusase et al. |
| 6,229,244 B1 | 5/2001 | Ragaly |
| 6,252,330 B1 | 6/2001 | Asao et al. |

\* cited by examiner

*Primary Examiner*—Tran Nguyen
(74) *Attorney, Agent, or Firm*—John E. Kajander, Esq.

(57) ABSTRACT

An alternator rotor assembly 30 is provided, including a rear pole piece 34 having a rear pole base portion 58 and a plurality of rear pole finger portions 60 each having a rear pole fingertip 62. The plurality of rear pole finger portions 60 are positioned to form a plurality of rear pole finger gaps 64. The alternator rotor assembly 30 further includes a front pole piece 32 having a front pole base portion 50 and a plurality of front pole finger portions 52 each having a front pole fingertip 54. The plurality of front pole finger portions 52 are positioned to form a plurality of front pole finger gaps 56. The rear pole piece 34 and the front pole piece 32 are assembled such that the rear pole finger portions 60 are positioned within the front pole finger gaps 56 and the front pole finger portions 52 are positioned within the rear pole finger gaps 64. The alternator rotor assembly 30 further includes a plurality of link elements 70. The link elements 70 are positioned within the finger gaps 56, 64 and connect the front pole fingertips 54 to the rear pole base portion 58 and the rear pole fingertips 62 to the front pole base portion 50.

26 Claims, 4 Drawing Sheets

HIGH RPM/OUTPUT ROTOR

TECHNICAL FIELD

The present invention relates generally to an alternator assembly and more particularly to an alternator rotor assembly with improved RPM and output capabilities.

BACKGROUND OF THE INVENTION

Alternators are utilized in a wide variety of applications within a wide variety of fields. The automotive industry makes frequent usage of these systems within their vehicles. A popular style of alternator within the automotive field utilizes a Lundell style alternator rotor to provide the magnetic field. The use of this traditional style alternator rotor, however, has come into conflict with industry trends calling for increased electrical power, improved power density, and increased speed capability from their alternators.

The apparent conflict arises from well known methods of increasing electrical power output from a Lundell alternator design. One method commonly involves spinning the rotor faster within the alternator since the power output of the alternator increases with rotor speed. The increase in rotor speed is commonly accomplished through a reduction in the size of the alternator pulley on creating a high pulley ration between the engine's crank pulley and the alternator pulley. Another well-known approach to increasing electrical power output is to reduce the air-gap between the outside diameter of the rotor and the inside diameter of the stator. However, this air-gap can serve to limit the speed capability of the rotor.

Centrifugal forces act on the rotor and deflect the fingers of the pole toward the stator, effectively closing the air-gap between the two. The pole fingers deflect outwardly due to the centrifugal forces until they contact the stator core inside diameter causing an immediate alternator failure. FIG. 2 illustrates the movement of the fingers of one pole from low to high RPMs. The pole fingers deflect outwardly due to the cantilever nature of the design under the influence of both centrifugal force and magnetic attraction between the rotor outside and the stator inside. Therefore, when the air-gap is reduced, the RPM capability must be reduced to insure the fingers do not deflect into the stator. Thus, the rotor RPM and the air-gap can work against each other in a traditional Lundell style design.

There are several known methodologies for attempting to increase RPM while minimizing air-gap. One such approach has been to increase the strength of the fingers. The fingers can be strengthened by increasing their cross-sectional thickness. This method, however, can result in less room for the field coil windings yielding less field strength. The field strength capability of the rotor is proportional to the amount of room dedicated for the field wire winds. Therefore, increasing the thickness of the fingers results in decreased field strength and lower electrical output for the alternator. Additionally, the thicker fingers decrease the air-gap between features on opposing magnetic poles resulting in additional leakage flux, lowering the electrical output ability. Thus the approach of increasing finger cross-section alone is often not a satisfactory approach to increasing alternator output.

An alternate known approach attempts to restrain the fingers from flexing outward during high RPM operation. This approach utilizes bands around the outside diameter of the rotor to restrain such deflection. The bands, however, are generally positioned in the air-gap between the rotor and the stator and thereby requiring an increase in the air-gap resulting in a diminished output of the alternator. This is often true whether the bands are simply wrapped around the outside diameter or if they are placed in cut grooves. The band material must be non-magnetic (since they touch fingers of both pole pieces having opposite magnetic polarities during operation) and therefore any portion of the air-gap taken up by the bands acts effectively as additional air-gap. If the bands were to be magnetic they would provide a direct leakage path for flux to "short circuit" between the two poles.

Materials known to be utilized for such bands include stainless steel, fiber reinforced wound composites, and aluminum. Stainless steel and fiber reinforced wound compounds are both expensive and can be difficult to process. Aluminum bands need to be large to sustain the mechanical stress from the fingers. The increase dimensions of the aluminum bands further increases the amount of the air-gap taken up my non-magnetic bands and can result in inferior performance. Additionally the use of any bands wrapped around the outside diameter of the rotors can add a substantial amount of rotating inertia to the rotor assembly. Rotating inertia can limit the pulley ratio between the alternator and the engine due to the potential for belt slip. In addition, the fingers and bands often still deflect under high RPM and therefore require additional air-gap spacing.

Finally, an additional undesirable aspect of traditional Lundell style alternator designs arises from the vibration of the fingers during operation. Finger vibration amplitude is excited due to magnetic forces acting on the finger face and the ends of the stator teeth. These attraction forces causes the rotor to excite when a natural frequency is reached and can cause undesirable audible noise.

It would, therefore, be highly desirable to have an alternator rotor assembly with improved capacity for increased RPM usage, a capacity for a decreased air-gap, and that provided a reduction in audible noise caused by finger vibration.

SUMMARY OF THE INVENTION

In accordance with the present invention, an alternator rotor assembly is provided. The alternator rotor assembly includes a rear pole piece having a rear pole base portion and a plurality of rear pole finger portions each having a rear pole fingertip. The plurality of rear pole finger portions are positioned to form a plurality of rear pole finger gaps. The alternator rotor assembly further includes a front pole piece having a front pole base portion and a plurality of front pole finger portions each having a front pole fingertip. The plurality of front pole finger portions are positioned to form a plurality of front pole finger gaps. The rear pole piece and the front pole piece are assembled such that the rear pole finger portions are positioned within the front pole finger gaps and the front pole finger portions are positioned within the rear pole finger gaps.

The alternator rotor assembly further includes a plurality of link elements. The link elements are positioned within the finger gaps and connect the front pole fingertips to the rear pole base portion and the rear pole fingertips to the front pole base portion. In this fashion the deflection of the fingertips due to centrifugal forces is reduced.

Other advantages and features of the present invention will become apparent when viewed in light of the detailed description of the preferred embodiment when taken in conjunction with the attached drawings and the appended claims.

DESCRIPTION OF THE PREFERRED EMBODIMENT(S)

Figure 1:
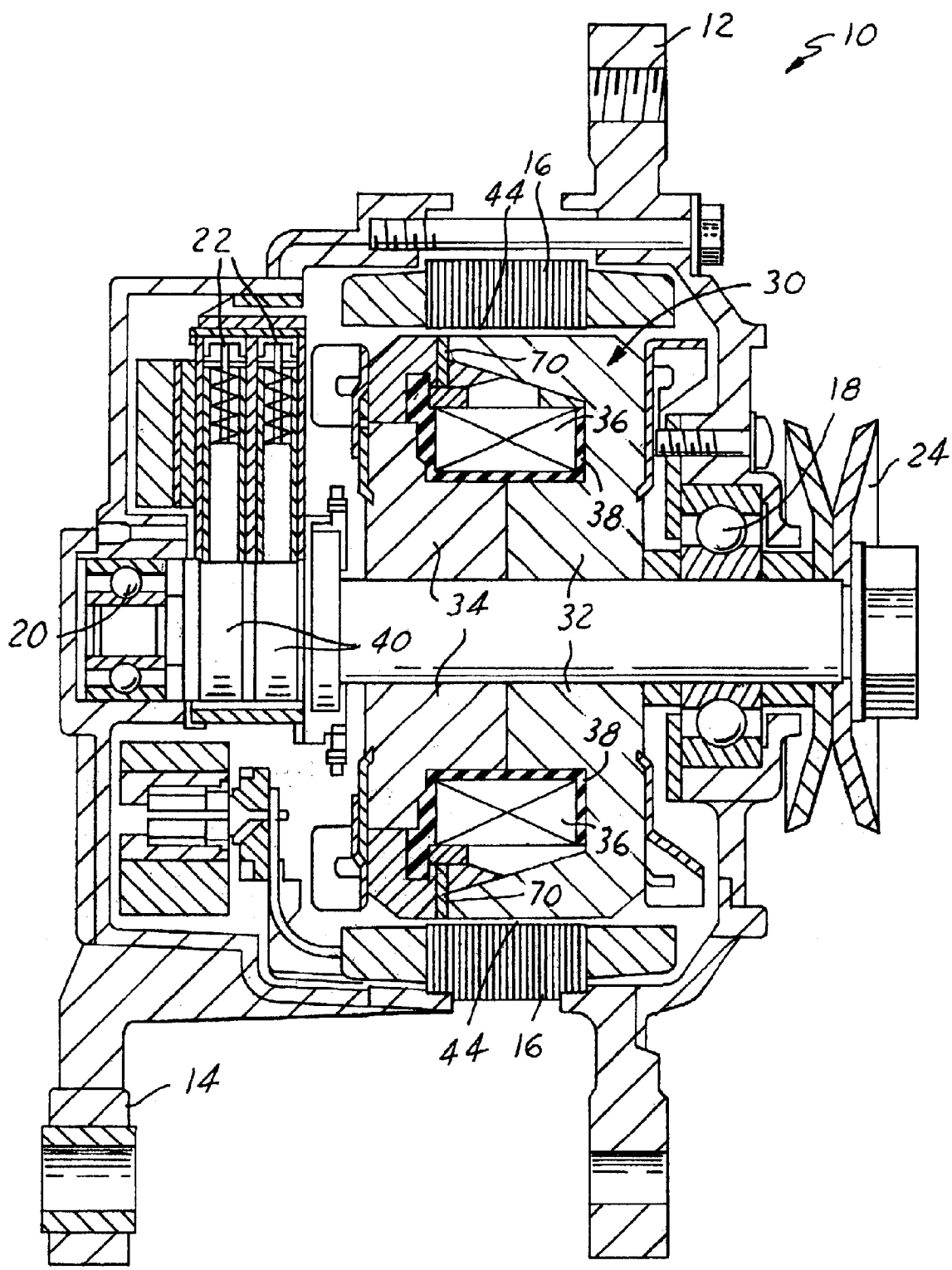
FIG. 1 is an cross-sectional illustration of an embodiment of an alternator assembly in accordance with the present invention.

Referring now to FIG. 1, which is a cross-sectional illustration of an alternator assembly 10 in accordance with the present invention. The alternator assembly 10 depicted is for illustrative purposes only. It should be understood that a wide variety of alternator designs are contemplated by the present invention. The alternator assembly 10 includes a front housing 12, a rear housing 14, and a stator 16. The alternator assembly 10 further includes front bearings 18, rear bearings 20 and brushes 22. The alternator assembly 10 can further include an alternator pulley 24 for communication with an engine crank pulley (not shown). These components and their functions are well known in the prior art. These components surround and house the alternator rotor assembly 30.

The alternator rotor assembly 30 includes a front pole piece 32 and a rear pole piece 34 housing a field coil 36 wound on an insulating rotor bobbin 38. The field coil 36 is typically in electrical communication with at least one slip ring 40. A shaft 42 can be press fit into the center bores of the pole pieces 32, 34 providing a mechanical lock to hold the pole pieces 32, 34 together and an axis to rotate about. The slip ring 40 provides electrical communication with the alternator brushes 22. The alternator rotor assembly 30 as thus described is well known and understood in the prior art.

Figure 2:
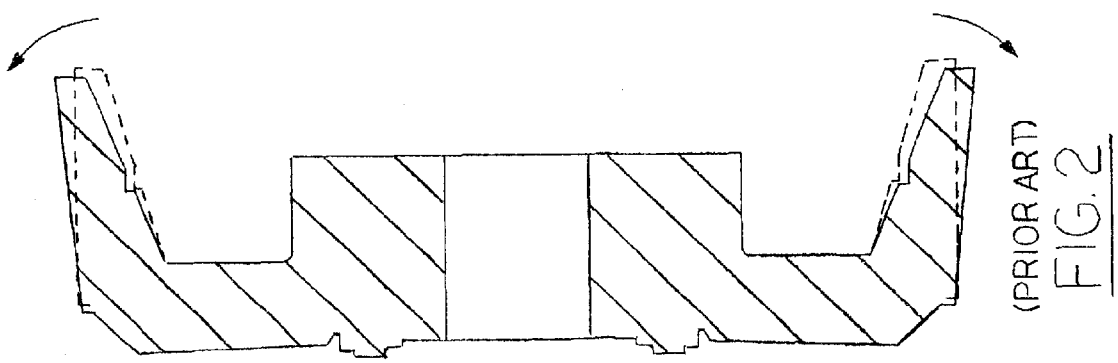
FIG. 2 is an illustration of a the deflection of a pole piece in relation to RPM as reflected in the prior art.

Referring now to FIG. 2, which is a cross-sectional illustration of a pole piece 132 as known in the prior art. Pole piece 132 commonly consists of a base portion 150 and a plurality of finger portions 152. As the rotational speed of the pole piece 132 increases within the alternator, the finger tips 154 deflect outward from a static position 156' to a deflected position 158. This deflection can serve to bridge the air-gap 44 (see FIG. 1) located between the stator 16 and the pole piece 132. Since the deflected position 158 is in relation to the rotational speed of the pole piece 132, prior art has often had to reduce rotational speed or increase the air-gap in order to provide proper operation of the alternator.

Figure 3:
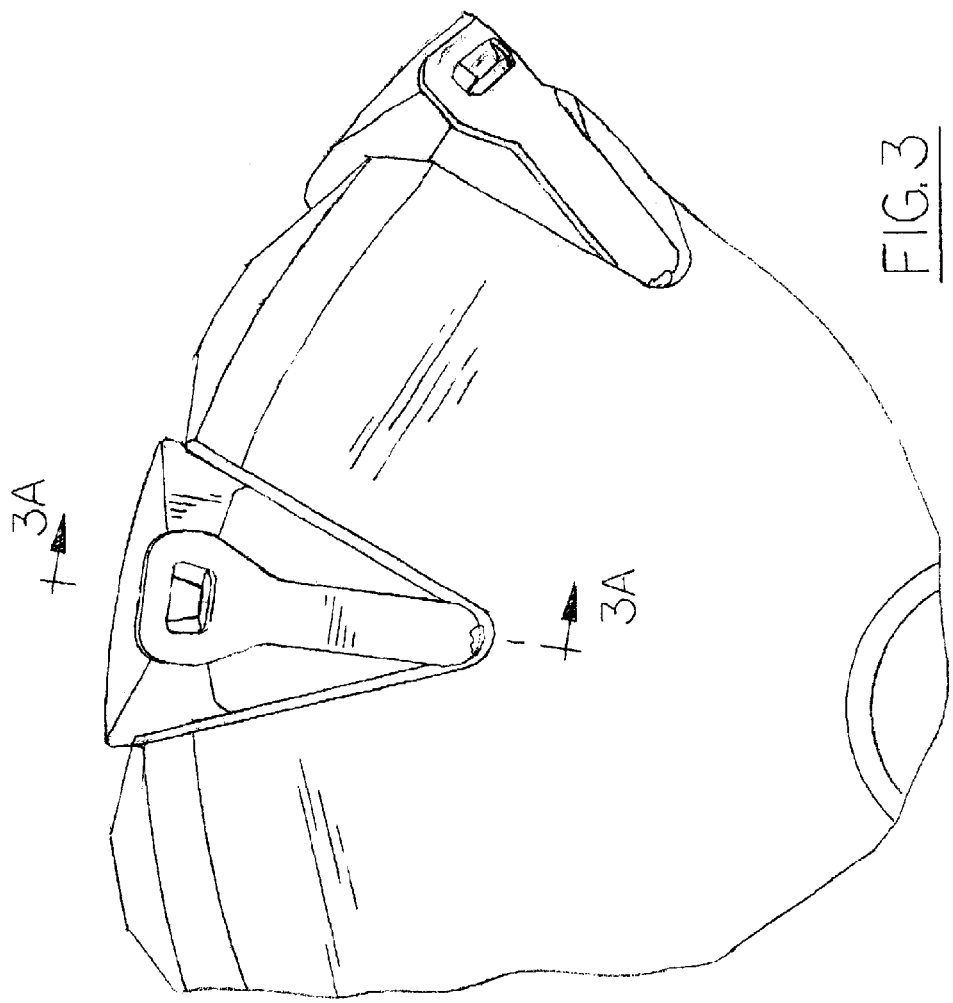
FIG. 3 is an illustration of an alternator rotator assembly in accordance with the present invention.
Figure 3A:
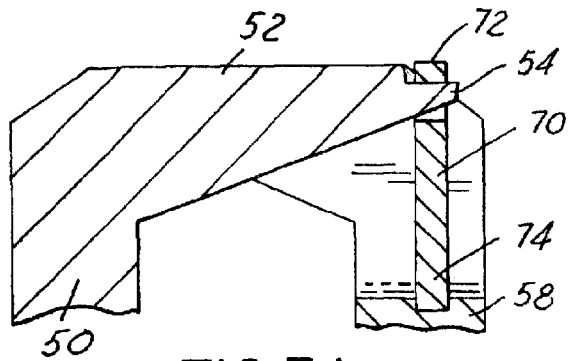
FIG. 3A is a cross-sectional detail of the embodiment of the alternator rotator assembly illustrated in FIG. 3.

The present invention improves upon this prior art by reducing such unwanted deflection. FIG. 3 illustrates an embodiment of an alternator rotor assembly 30 in accordance with the present invention. The alternator rotor assembly 30 includes a front pole piece 32 that is made up of a front pole base portion 50 and a plurality of front pole finger portions 52. Each front pole finger portion 52 contains a front pole fingertip 54. The plurality of front pole finger portions 52 are positioned to form a plurality of front pole finger gaps 56. The alternator rotor assembly 30 further includes a rear pole piece 34. The rear pole piece 34 is made up of a rear pole base portion 58 (See FIG. 3A) and a plurality of rear pole finger portions 60. Each rear pole finger portion 60 contains a rear pole fingertip 62. The plurality of rear pole finger portions 60 are positioned to form a plurality of rear pole finger gaps 64.

The rear pole piece 34 and the front pole piece 32 are assembled such that the rear pole finger portions 60 are positioned within the front pole finger gaps 56 and the front pole finger portions 52 are positioned within the rear pole finger gaps 64. It should be understood that the front pole piece 32, the rear pole piece 34 and their corresponding components, can be manufactured in a wide variety of methods. In one embodiment, it is contemplated that they may be forged. In still another they may be stamped. Secondary manufacturing process such as machining of the fingertips is also contemplated.

Figure 4A:
FIG. 4 is a detail of a link element for use in an alternator rotator assembly in accordance with the present invention.
Figure 4B:
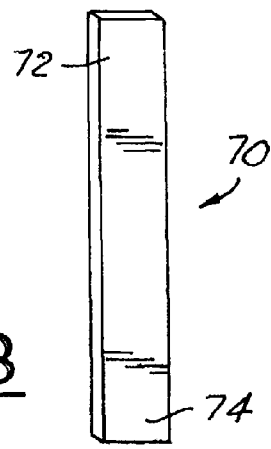

The alternator rotor assembly 30 further includes a plurality of link elements 70 (see also FIGS. 4A and 4B). The link elements 70 are positioned within the finger gaps 56, 64 and connect the front pole fingertips 54 to the rear pole base portion 58 and the rear pole fingertips 62 to the front pole base portion 50. The link elements 70 are preferably made of a non-magnetic material. A variety of materials and forms may be utilized to form the nonmagnetic link elements 70. These materials include, but are not limited to, aluminum, stainless steel, and carbon fiber based materials. The link elements 70 create a robust and strong mechanical support between the fingertips 52,64 and the opposite pole's base 50,58. The link elements 70 may be formed in a variety of shapes and configurations and may be attached to the pole pieces 32,34 in a variety of fashions.

Figure 3B:
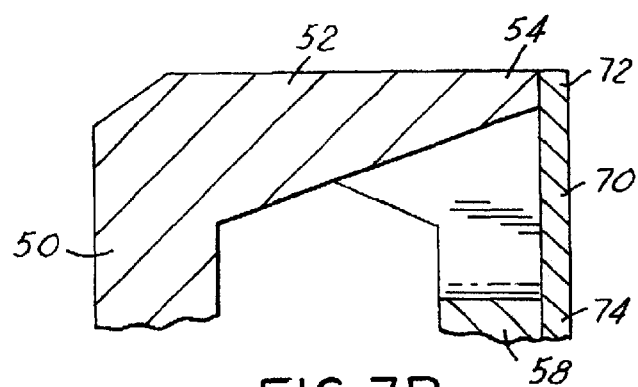
FIG. 3B is an alternate embodiment of the alternator rotor as illustrated in FIG. 3.

In one embodiment, it is contemplated that the link elements 70 may be formed with a link head portion 72 and a link base portion 74. They may also vary in shape from simple (FIG. 4B) to relatively complex (FIG. 4A). In the embodiment shown in FIGS. 3A and 4A the link head portion 72 includes a guide bore 76. The guide bore 76 and the corresponding pole fingertip 54, 62 can be formed to engage each other such that the pole fingertip 54, 62 is secured within the link element 70. In another embodiment it is contemplated that the link head portion 72 may simply be welded to the pole fingertip 54, 62 (see FIGS. 3B and 4B). Although two approaches to securing the link head portion 72 to a pole fingertip 54, 62 have been described, it should be understood that a wide variety of approaches, including the use of epoxy, would be obvious to one skilled in the art.

Figure 3C:
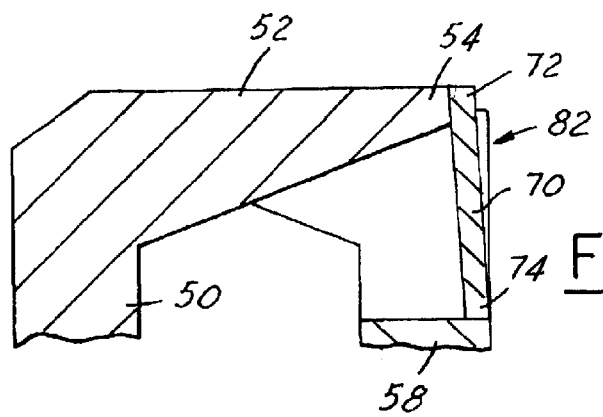
Figure 3D:
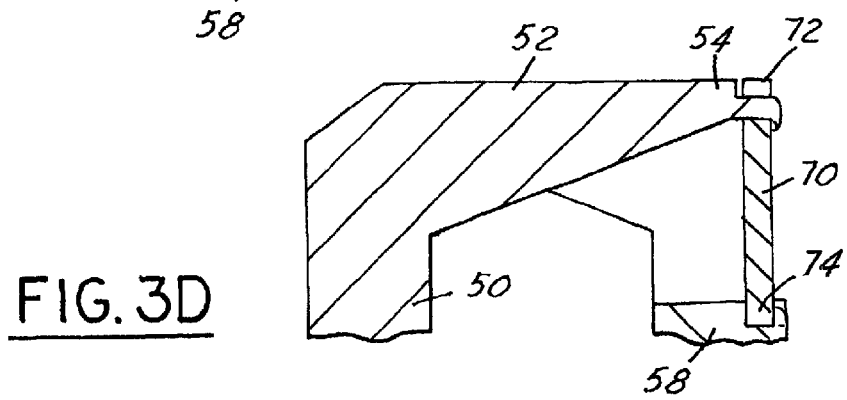
Figure 5:
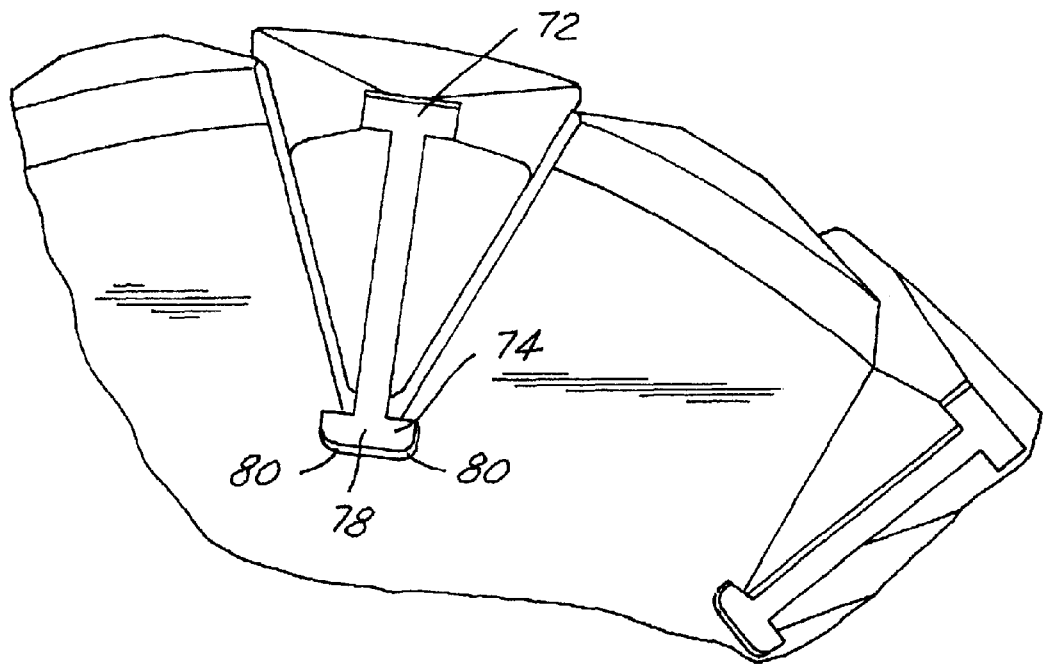
FIG. 5 is an illustration of an alternator rotor assembly illustrating an embodiment of a link element in accordance with the present invention.

Similarly the link base portion 74 can be secured to the pole base 50, 58 in a variety of fashions. In the embodiment, illustrated in FIGS. 3A and 3B, the link base portion 74 is welded to the appropriate base 50, 58. In the embodiment illustrated in FIG. 5, the link base portion 74 is formed with a key portion 78 formed to fit in a base pocket 80 formed in the appropriate base 50, 58. The use of pockets 80 can be used to swedge material surrounding the pocket over the key portion 78 to secure the link base portion 74 (see FIG. 3D). Similarly, when the guide bore 76 is used, the fingertips 54, 56 can be swedged over the guide bore 76 to further secure the link element 70. This configuration allows for a secure, quick, and simple assembly procedure. Again, although two approaches have been described for securing the link element 70 to a pole base 50, 58, a variety of approaches would be obvious to one skilled in the art. In another embodiment, the link head portion 72 can be secured using a guide bore 76 and the link base portion 74 can be secured using a base pocket 80 (see FIG. 3D). It is further contemplated that the use of a guide bore 76 or base pocket 80 does not preclude the additional use of other securing methods such as welding or epoxy.

Through the use of the non-magnetic link elements 70, the pole fingertips 54,62 are restrained and deflections are reduced. The link elements 70 provide improved support over traditional Lundell designs and banded Lundell designs since the majority of the mechanical load on the link elements 70 is tensile. Banded designs often apply bending loads to the bands and therefore often do not offer the same resistance to deflection. It should be understood, however, that the link elements 70 need not be mounted perpendicular to the fingertips 54,62 and bases 50,58 as indicated in the embodiment shown in FIG. 3. The link elements 70 can also be mounted in an angled position 82 illustrated in FIGS. 5 and 3C. The angled position 82 can be used to facilitate the use of the pocket 80 (FIG. 5) without costly manufacturing techniques.

The present invention also can present cost benefits over band/ring rotor assembly. Band/ring assemblies often require large bands with increased cross-sectional areas in order to properly restrain deflection. The link elements 70, however, are comparatively short elements that can be manufactured using a wide variety of techniques including cost effective and simple stamping procedures. The link elements 70 can also provide reduced tolerances when compared to prior art restraining techniques.

Also, the link elements 70 provide less rotational inertia than many banded designs. The link elements 70 can be smaller in mass and are directed toward the axis of rotation of the alternator rotor assembly 30. This can result in a reduced rotating inertia when compared to certain prior art designs. Additionally, the present invention can reduce finger vibration amplitude caused by the excitation of the pole fingertips 54,62 by the magnetic field. When unchecked, these excitations can cause the alternator rotor assembly 30 to excite when a natural frequency is reached causing undesirable audible noise. The present invention can reduce the presence of such audible noise and thereby further increase the desirability of the alternator design.

An example of the traditional Lundell design, a banded Lundell design, and one embodiment of the present invention were analyzed strictly for illustrative purposes. The traditional Lundell design was found to have a static air-gap 44 of 0.3 mm. The traditional Lundell design was found to experience 0.2 mm deflection of the fingertips at 20 k–25 k RPM resulting in a 0.1 mm air-gap 44. The banded Lundell design tested had a static air-gap 44 of 0.2 mm. It experienced a 0.1 mm deflection of the fingertips at 20 k–25 k RPM resulting in a 0.1 mm air-gap 44. One embodiment of the present invention, however, was designed to have a static air-gap 44 of 0.1 mm and was found to deflect 0.05 mm at 20 k–25 k RPM thus resulting in a 0.05 mm air-gap 44. Thus in at least one set of tests, the present invention was found to result in a 50% improvement over the prior art tested. The results described are for illustrative purposes and are not intended to create limitations on the present invention.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:
1. An alternator rotor assembly comprising:
a rear pole piece comprising a rear pole base portion and a plurality of rear pole finger portions, each of said rear pole finger portions having a rear pole fingertip;
a plurality of rear pole finger gaps formed through the positioning of said plurality of rear pole finger portions;
a front pole piece comprising a front pole base portion and a plurality of front pole finger portions, each of said front pole finger portions having a front pole fingertip;
a plurality of front pole finger gaps formed through the positioning of said plurality of rear pole finger portions; and
a plurality of link elements comprising a link head portion and a link base portion, said plurality of link elements positioned within said finger gaps, said plurality of link elements radially connecting said front pole fingertips to said rear pole base portion and said rear pole fingertips to said front pole base portion;
wherein said rear pole finger portions are positioned within said front pole finger gaps and said front pole finger portions are positioned within said rear pole finger gaps.

2. An alternator rotor assembly as described in claim 1 wherein said plurality of link elements are formed from a non-magnetic material.

3. An alternator rotor assembly as described in claim 1 wherein said plurality of link elements are formed from stainless steel.

4. An alternator rotor assembly as described in claim 1 wherein each of said plurality of link elements comprises a guide bore, each of said plurality of rear pole fingertips and said plurality of front pole fingertips positioned within each of said guide bores.

5. An alternator rotor assembly as described in claim 4 wherein said plurality of rear pole fingertips and said plurality of front pole fingertips are swedged over said guide bores to secure said plurality of link elements.

6. An alternator rotor assembly as described in claim 1 wherein said one of said link ends is welded to one of said plurality of rear pole fingertips and said plurality of front pole fingertips.

7. An alternator rotor assembly as described in claim 1 wherein said one of said link ends is welded to one of said plurality of rear pole base portions and said plurality of front pole base portions.

8. An alternator rotor assembly as described in claim 1, further comprising a plurality of pockets formed in said plurality of rear pole base portions and said plurality of front pole base portions.

9. An alternator rotor assembly as described in claim 8, wherein said link base portion comprises a key portion, said key portion shaped to fit within one of said plurality of pockets and thereby secure one of said plurality of link elements to one of said plurality of rear pole base portions or said plurality of front pole base portions.

10. An alternator rotor assembly as described in claim 9 wherein one of said plurality of pockets is swedged over said key portion to secure said link base portion.

11. An alternator rotor assembly as described in claim 1, wherein said plurality of link elements are mounted perpendicular to said plurality of rear pole fingertips and said plurality of front pole fingertips.

12. An alternator rotor assembly as described in claim 1, wherein said plurality of link elements are mounted on an angle to said rear pole base portion and said front pole base portion.

13. An alternator rotor assembly as described in claim 1 further comprising:
- a rotor bobbin positioned within said rear pole piece and said front pole piece; and
- a field coil wrapped around said rotor bobbin.

14. An alternator assembly comprising:
- a housing;
- a rear pole piece, positioned within said housing, comprising a rear pole base portion and a plurality of rear pole finger portions, each of said rear pole finger portions having a rear pole fingertip;
- a plurality of rear pole finger gaps formed through the positioning of said plurality of rear pole finger portions;
- a front pole piece, positioned within said housing, comprising a front pole base portion and a plurality of front pole finger portions, each of said front pole finger portions having a front pole fingertip;
- a plurality of front pole finger gaps formed through the positioning of said plurality of front pole finger portions;
- a plurality of link elements comprising a link head portion and a link base portion, said plurality of link elements positioned within said finger gaps, said plurality of link elements radially connecting said front pole fingertips to said rear pole base portion and said rear pole fingertips to said front pole base portion;
- a stator positioned within said housing, said stator surrounding said rear pole piece and said front pole piece, said stator defining an air-gap between said stator and said pole pieces;
- wherein said plurality of link elements reduce deflection of said front pole fingertips and said rear pole fingertips into said air-gap.

15. An alternator rotor assembly as described in claim 14 wherein said plurality of link elements are formed from a non-magnetic material.

16. An alternator rotor assembly as described in claim 14 wherein said plurality of link elements are formed from stainless steel.

17. An alternator rotor assembly as described in claim 14 wherein each of said plurality of link elements comprises a guide bore, said plurality of rear pole fingertips and said plurality of front pole fingertips positioned within each of said guide bores.

18. An alternator rotor assembly as described in claim 14 wherein said plurality of rear pole fingertips on said plurality of front pole fingertips are swedged over said guide bores to secure said plurality of link elements.

19. An alternator rotor assembly as described in claim 14 wherein said one of said link ends is welded to one of said plurality of rear pole fingertips and said plurality of front pole fingertips.

20. An alternator rotor assembly as described in claim 12 wherein said one of said link ends is welded to one of said plurality of rear pole base portions and said plurality of front pole base portions.

21. An alternator rotor assembly as described in claim 14, further comprising a plurality of pockets formed in said plurality of rear pole base portions and said plurality of front pole base portions.

22. An alternator rotor assembly as described in claim 21, wherein said link base portion comprises a key portion, said key portion shaped to fit within one of said plurality of pockets and thereby secure one of said plurality of link elements to one of said plurality of rear pole base portions or said plurality of front pole base portions.

23. An alternator rotor assembly as described in claim 14 wherein one of said plurality of pockets is swedged over said key portion to secure said link base portion.

24. An alternator rotor assembly as described in claim 14, wherein said plurality of link elements are mounted perpendicular to said plurality of rear pole fingertips and said plurality of front pole fingertips.

25. An alternator rotor assembly as described in claim 14, wherein said plurality of link elements are mounted on an angle to said rear pole base portion and said front pole base portion.

26. An alternator rotor assembly as described in claim 14 further comprising:
- a rotor bobbin positioned within said rear pole piece and said front pole piece;
- a field coil wrapped around said rotor bobbin.

* * * * *